United States Patent
Weber et al.

(10) Patent No.: US 11,533,388 B2
(45) Date of Patent: Dec. 20, 2022

(54) METHOD AND DEVICE FOR ANALYZING SERVICE-ORIENTED COMMUNICATION

(71) Applicant: Robert Bosch GmbH, Stuttgart (DE)

(72) Inventors: Andreas Weber, Weissach (DE); Janin Wolfinger, Birkenfeld (DE); Jens Gramm, Tuebingen (DE); Michael Herrmann, Düsseldorf (DE)

(73) Assignee: Robert Bosch GmbH, Stuttgart (DE)

( * ) Notice: Subject to any disclaimer, the term of this patent is extended or adjusted under 35 U.S.C. 154(b) by 92 days.

(21) Appl. No.: 16/919,064

(22) Filed: Jul. 1, 2020

(65) Prior Publication Data
US 2021/0014340 A1 Jan. 14, 2021

(30) Foreign Application Priority Data
Jul. 10, 2019 (DE) .......................... 102019210229.8

(51) Int. Cl.
*G06F 15/16* (2006.01)
*H04L 69/22* (2022.01)
(Continued)

(52) U.S. Cl.
CPC .............. *H04L 69/22* (2013.01); *H04L 45/74* (2013.01); *H04L 67/51* (2022.05)

(58) Field of Classification Search
CPC ......... H04L 69/22; H04L 45/74; H04L 67/16; H04L 12/46; H04L 12/56; H04L 63/029
(Continued)

(56) References Cited

U.S. PATENT DOCUMENTS

| 8,069,483 | B1* | 11/2011 | Matlock | .............. | H04W 12/126 |
| | | | | | 726/23 |
| 2008/0013534 | A1* | 1/2008 | Tsuzuki | ................ | H04L 67/146 |
| | | | | | 370/389 |

(Continued)

FOREIGN PATENT DOCUMENTS

| EP | 1589716 A1 * | 10/2005 | ........... G06F 21/316 |
| WO | WO-2018014928 A1 * | 1/2018 | ............. H04L 43/12 |

OTHER PUBLICATIONS

Capacity simulations and analysis for cdma2000 packet data services Lin Ma;Zhigang Rong Vehicular Technology Conference Fall 2000. IEEE VTS Fall VTC2000. 52nd Vehicular Technology Conference (Cat. No. 00CH37152) (Year: 2000).*

(Continued)

*Primary Examiner* — Oscar A Louie
*Assistant Examiner* — Oluwatosin M Gidado
(74) *Attorney, Agent, or Firm* — Norton Rose Fulbright US LLP; Gerard Messina

(57) ABSTRACT

A device and a method for analyzing service-oriented communication in a communications network. A data packet includes a first header of an application layer for service-oriented communication, and a second header of a presentation layer, a session layer, a transport layer, a network layer, a data link layer, or a physical layer. The data packet is analyzed based on information concerning a sender and/or receiver of the data packet from the first header and as a function of information concerning a sender and/or receiver from the second header, for whether or not the data packet meets a criterion, the criterion defining a setpoint value for the sender and/or receiver in the first header as a function of the content of the second header, and/or the criterion defining a setpoint value for the sender and/or receiver in the second header as a function of the content of the first header.

13 Claims, 5 Drawing Sheets

(51) Int. Cl.
    *H04L 45/74*     (2022.01)
    *H04L 67/51*     (2022.01)

(58) Field of Classification Search
    USPC ........................................................ 709/224
    See application file for complete search history.

(56) References Cited

U.S. PATENT DOCUMENTS

| | | | | |
|---|---|---|---|---|
| 2011/0134930 | A1* | 6/2011 | McLaren | H04L 47/34 370/401 |
| 2012/0173905 | A1* | 7/2012 | Diab | H04L 12/66 713/320 |
| 2016/0308886 | A1* | 10/2016 | Lee | H04L 63/1441 |
| 2017/0006437 | A1* | 1/2017 | Guo | H04W 72/0413 |
| 2017/0346858 | A1* | 11/2017 | Vashi | H04L 65/1073 |
| 2020/0128114 | A1* | 4/2020 | Kloberdans | H04W 4/70 |
| 2020/0313759 | A1* | 10/2020 | C S | H04L 61/2007 |

OTHER PUBLICATIONS

Topology Verification Enabled Intrusion Detection for In-Vehicle CAN-FD Networks Tianqi Yu;Xianbin Wang IEEE Communications Letters Year: 2020 | vol. 24, Issue: 1 | Journal Article | Publisher: IEEE (Year: 2020).*

CANintelliIDS: Detecting In-Vehicle Intrusion Attacks on a Controller Area Network Using CNN and Attention-Based GRU Abdul Rehman Javed;Saif ur Rehman;Mohib Ullah Khan;Mamoun Alazab;Thippa Reddy G IEEE Transactions on Network Science and Engineering Year: 2021 | vol. 8, Issue: 2 | Journal Article | (Year: 2021).*

\* cited by examiner

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| Message ID (Service ID / Method ID [32 bit]) (= 0xFFFF 8100 ) |||||||||||||||||||||||||||||||
| Length [ 32 bit ] |||||||||||||||||||||||||||||||
| Request ID (Client ID / Session) [ 32 bit ] |||||||||||||||||||||||||||||||
| Protocol Version [8 bit] =0x01 ||||||||| Interface Version [8 bit] =0x01 ||||||||| Message Type [8 bit] =0x02 ||||||||| Return Code [8 bit] =0x00 |||||||||
| Flags [8 bit] ||||||||| Reserved [24 bit] ||||||||||||||||||||||||
| Length of Entries Array [ 32 bit ] |||||||||||||||||||||||||||||||
| Entries Array |||||||||||||||||||||||||||||||
| Length of Options Array [ 32 bit ] |||||||||||||||||||||||||||||||
| Options Array |||||||||||||||||||||||||||||||

Fig. 4

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| Lenght (=0x0009) | | | | | | | | | | | | | | | | Type (=0x04) | | | | | | | | Reserved (=0x00) | | | | | | | |
| IPv4-Address [32 bit] | | | | | | | | | | | | | | | | | | | | | | | | | | | | | | | |
| Reserved (=0x00) | | | | | | | | L4-Proto (TCP/UDP...) | | | | | | | | Port Number | | | | | | | | | | | | | | | |

Fig. 5

METHOD AND DEVICE FOR ANALYZING SERVICE-ORIENTED COMMUNICATION

CROSS REFERENCE

The present application claims the benefit under 35 U.S.C. § 119 of German Patent Application No. DE 102019210229.8 filed on Jul. 10, 2019, which is expressly incorporated herein by reference in its entirety.

FIELD

The present invention is directed to a method and a device for analyzing service-oriented communication, in particular in a communications network of a vehicle, for example an automotive Ethernet network.

BACKGROUND INFORMATION

Service-oriented communication uses service-oriented communication protocols and a service-oriented network architecture that is implemented using service-oriented middleware.

An effective analysis of the service-oriented communication is desirable in particular for detecting intrusions on the communications network.

SUMMARY

This is achieved by example embodiments of the present invention.

In accordance with an example embodiment of the present invention, a method for analyzing service-oriented communication in a communications network provides that a data packet includes a first header of an application layer for service-oriented communication, and a second header of a protocol layer, which is different from the application layer, for communication in the communications network, in particular a second header of a presentation layer, a session layer, a transport layer, a network layer, a data link layer, or a physical layer, the data packet being analyzed, as a function of information concerning a sender and/or receiver of the data packet from the first header and as a function of information concerning a sender and/or receiver from the second header, for whether or not the data packet meets a criterion, the criterion defining a setpoint value for the sender and/or receiver in the first header as a function of the content of the second header, and/or the criterion defining a setpoint value for the sender and/or receiver in the second header as a function of the content of the first header. This analysis allows provision of a particularly effective NIDPS for an automotive network. This analysis of the service-oriented communication takes place in particular for an intrusion detection in the communications network. The intrusion detection takes place, for example, via a Network Intrusion Detection and Prevention System (NIDPS). The NIDPS allows the identification of and response to anomalies in the network traffic of a distributed computer system that communicates via the communications network. NIDPSs are understood to mean systems that are typically used to detect and prevent intrusions of corporate networks, so-called enterprise networks. NIDPSs may also be used in automotive networks. Automotive networks are internal networks of vehicles, with Electronic Control Units (ECUs) as network nodes.

The setpoint value preferably defines at least one registered end point, the header being checked, as a function of the content, whether the data packet is sent from a registered end point and/or whether the data packet is sent to a registered end point. This allows data packets to be detected as suspicious data packets when either the sender or the receiver is not a registered end point. The other end point of the communication does not have to be registered. This allows registered end points to communicate with an end point that is not registered beforehand.

The setpoint value preferably defines registered end points, the header being checked, as a function of the content, whether the data packet is exchanged between end points that are registered for the service-oriented communication. This allows data packets to be detected as suspicious data packets when they are not sent between registered end points.

The setpoint value preferably defines at least one registered end point, the data packet including an identification of a service, for a sender end point of the data packet it being checked whether this sender end point corresponds to the service provider designated in the data packet, identified by its identification of the service, and for a receiver end point of the data packet it being checked whether this receiver end point corresponds to the service user designated in the data packet, identified by its identification of the client. This information represents a further particularly good piece of information for detecting suspicious data packets.

The setpoint value preferably defines at least one registered end point 102, 104, the data packet including an identification of a client, for a sender end point 102, 104 of the data packet it being checked 606 whether this sender end point corresponds to the service user designated in the data packet, identified by its identification of the client, and for a receiver end point 102, 104 of the data packet it being checked 606 whether this receiver end point corresponds to the service provider designated in the data packet, identified by its identification of the service.

The setpoint value preferably defines registered end points, the data packet including an identification of a service and an identification of a client, it being checked whether the data packet is exchanged between end points that are registered for the identification of the service and identification of the client identified in the data packet, in particular it being checked whether the sender end point and the receiver end point of the data packet form a registered combination. The registered combination represents a further particularly good piece of information for detecting suspicious data packets.

The data packet preferably includes information concerning a message type, it being checked whether the data packet is exchanged between a service user and a service provider in a direction corresponding to the message type, and/or a direction being defined as a function of information concerning a sender end point and/or a receiver end point of the data packet, it being checked whether the data packet is exchanged between a service user and a service provider in this direction. The direction represents a further particularly good piece of information for detecting suspicious data packets.

During a service discovery phase it is preferably checked whether for a data packet, via which information concerning an end point that provides a service is transmitted, this end point is an end point that is registered as a service provider and/or is an end point that is registered for this service as a service provider. Suspicious data packets are thus already detectable in this phase.

During a service discovery phase it is preferably checked whether for a data packet, via which information concerning an end point that queries a service is transmitted, this end point is an end point that is registered as a service user and/or is an end point that is registered for this service as a service user. For certain services, suspicious data packets are thus already detectable in this phase in an even more reliable manner.

An anomaly or an intrusion on the communications network is preferably detected when the criterion is not met. This represents a reliable detection of the anomaly or the intrusion as a function of communication layer-encompassing information from the data packet.

Before checking the criterion, it is preferably checked whether the data packet is part of a service-oriented communication, the check of the criterion being carried out when the data packet is part of a service-oriented communication, and otherwise the check not taking place. Thus, only relevant data packets are analyzed.

In accordance with an example embodiment of the present invention, a device for analyzing service-oriented communication in a communications network includes an analysis device that is situated in a connecting element, in particular an automotive Ethernet switch, for connecting data lines in the communications network for transmitting data packets, or is connected or connectable to this connecting element for communication, the analysis device being designed to carry out the method. An analysis and an anomaly detection in an automotive network are thus possible in an effective manner.

Further advantageous specific embodiments result from the description below and the figures.

BRIEF DESCRIPTION OF THE DRAWINGS

FIG. 4 shows a SOME/IP-SD packet.

FIG. 5 shows a SOME/IP IPv4 end point option.

DETAILED DESCRIPTION OF EXAMPLE EMBODIMENTS

Figure 1:
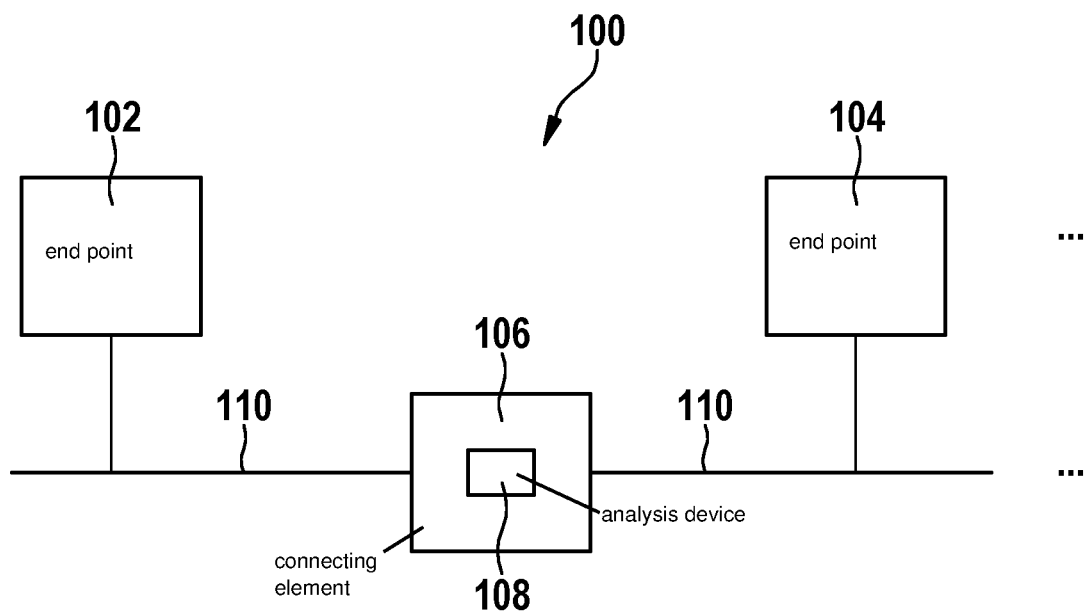
FIG. 1 shows a schematic illustration of a communications network.

To provide an NIDPS for an automotive network, differences between automotive networks and enterprise networks should be taken into account. These are, for example, the network structure, the network dynamics, and the network nodes of the networks.

Network Structure:

An enterprise network typically follows a client server model in which there are a fairly small number of dedicated server network nodes that provide services to a typically larger number of client network nodes. Automotive networks are made up of ECUs, on which server applications as well as client applications are carried out.

Enterprise networks are generally much larger and more complex than automotive networks. The entirety of an enterprise network is typically much more segmented, being physically or logically separated into various zones and subnetworks. ECUs in typical automotive networks are separated, if at all, by so-called "gateways" into only a very small number of subnetworks, or are logically separated at the Ethernet level via so-called "Virtual Local Area Networks" (VLANs).

Network Dynamics:

Enterprise networks and automotive networks differ in the dynamics with which the network is changed and operated.

Network nodes may be arbitrarily exchanged in enterprise networks. For changes in server network nodes, it is typically still possible to make an adaptation in the configuration of the defense systems such as the NIDPS. In contrast, such adaptations for network nodes that are clients are not possible. This is due to the fact that clients connect to the network from changing locations, and are frequently replaced. In addition, it cannot be accurately predicted which applications are carried out on a client.

ECUs in automotive networks are exchanged very rarely, if at all, and then are often replaced only by an identical copy. It is therefore very unlikely that there is any change in the functional performance of the network. The network nodes are well known in an automotive network. Likewise, the server and client applications that run on the automotive network are well-defined, and details concerning the network communication may be predefined.

In enterprise networks, nodes from outside connections may be incorporated into a corporate network. In an automotive network, all communication nodes of the network are part of the internal vehicle network.

In enterprise networks it is typically possible for various users to use the same client. In ECUs of automotive networks there are no users, only server and client applications that perform their service.

Network Node:

With regard to the resources, the network nodes of an enterprise network are generally much more resource-intensive with regard to memory and performance, for example, than ECUs of an automotive network.

With regard to the software, in enterprise networks the network nodes are usually equipped with widely used standard operating systems and standard software, for which security vulnerabilities are known. For this reason, NIDPS systems in enterprise networks are focused on signature-based detection when an attempt is made to exploit known security vulnerabilities. The network nodes in automotive networks are often equipped with less widely used software. A majority of the signatures from NIDPS systems for enterprise networks are not applicable, and there are no fairly large databases concerning vulnerabilities that are available specifically for automotive networks.

Although the basic task of an NIDPS, i.e., detection and response to anomalies in the network traffic, is the same for enterprise networks and automotive networks. It is apparent from the above discussion that the basic operating principle of an efficient NIDPS for automotive networks must be fundamentally different from that of an NIDPS for enterprise networks. Due to these functional differences between enterprise networks and automotive networks, NIDPSs for enterprise networks cannot be efficiently used for automotive networks.

An NIDPS for an automotive network must make use of the known, static network structure as well as the considerably lower dynamics of the network users to be able to efficiently detect anomalies with limited resources.

Aspects of a service-oriented architecture and aspects of service-oriented protocols are described below. A service-oriented architecture (SOA) is an architectural model in information technology from the field of distributed systems for structuring and utilizing services of IT systems. The interaction between a service provider ("service") and a service user ("client") in the network typically takes place according to the following model:

1) A service provider publishes or registers its service.

2) The software component that would like to use a service searches for it in a directory.

When the appropriate service is found, the procedures may go to the next step.

3) The component in use obtains from the directory a reference (address) via which it may access the service. The function call is tied to this address.

4) The service is called up. Input parameters are transmitted to the service, and output parameters are sent back as a response to the call.

Steps 1) through 3) are used to identify offered services with the aid of a central directory, and to find out how they may be addressed. This is also referred to as a "service discovery." In some service-oriented protocols, service discovery is also implemented without a central directory according to the so-called "publish/subscribe" model, in that components announce (publish) their offered services via multicast, and service users register (subscribe) for certain services if necessary.

Generally, identifiers exist in order to refer to individual service providers and service users in data packets of the service-oriented communication. These identifiers are referred to below as "service ID" for service providers or "client ID" for service users. In specific service-oriented communication protocols, other designations may also be used for this purpose. Generally, identifiers also exist in order to designate a message type of a data packet. This identifier is referred to below as "message type." For example, the message type "request" refers to a request by a service user to a service provider, and the message type "response" refers to the response of a service provider to a service user.

Examples of middleware, which implements a service-oriented communication infrastructure, include Scalable Service-Oriented Middleware over IP (SOME/IP) or Data Distribution Service (DDS). Both are used in the automotive field.

These types of middleware define corresponding communication protocols, which specify the manner in which data are exchanged within the service-oriented middleware. For SOME/IP, this is generally referred to herein as SOME/IP protocol.

FIG. 1 shows a schematic illustration of a communications network 100. Communications network 100 includes a first end point 102 of a communication relationship and a second end point 104 of a communication relationship. First end point 102 and second end point 104 are connected via a connecting element 106, in particular an automotive Ethernet switch. In the example, data in the communication relationship are exchanged via frames. Connecting element 106 is designed to receive a frame, and to forward it based on information from the frame. Communications network 100 is an automotive Ethernet network in the example. In the example, the information from the frame is information from the data link layer of the OSI model. The end points may be control units in a vehicle that communicate via the automotive Ethernet network. Communications network 100 includes an analysis device 108. Analysis device 108 includes an NIDPS, for example. Analysis device 108 is situated in the automotive Ethernet switch, for example. In FIG. 1, the analysis is depicted in a connecting element 106 of the communication. Alternatively or additionally, the analysis may additionally take place on an end point of the communication, for example first end point 102 or second end point 104. A portion of analysis device 108 or analysis device 108 as a whole may also be situated outside connecting element 106, and may be connected or connectable to communications network 100 or to connecting element 106 via a separate interface or via communications network 100. In the example, data lines 110 for the connection are situated in communications network 100. At least partially wireless connections may also be provided.

First end point 102 and second end point 104 are registered end points in the example. The registered end points are stored, for example, in a table in analysis device 108. The table may be statically stored as a function of a design of communications network 100 or of a definition of service providers and service users that are available in the vehicle. A database may also be used for this purpose. The registered end points may also be learned and stored during operation of communications network 100. First end point 102 and second end point 104 may be a sender end point as well as a receiver end point in the service-oriented communication. First end point 102 and second end point 104 may be a service provider as well as a service user in the service-oriented communication. A registered combination or multiple registered combinations with one another for the service-oriented communication of associated end points may also be provided or stored. A direction for a service-oriented communication may also be predefined or stored for such a combination or for individual registered end points.

Figure 2:
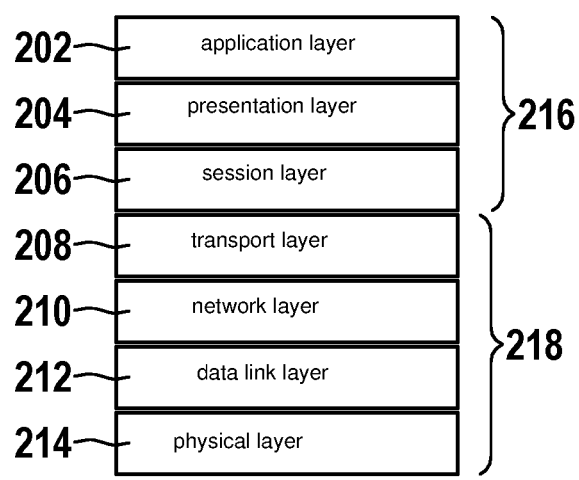
FIG. 2 shows a schematic illustration of protocol layers for the communications network.

FIG. 2 illustrates protocol layers for the communications network according to the OSI model. According to the OSI model a presentation layer 204, a session layer 206, a transport layer 208, a network layer 210, a data link layer 212, and a physical layer 214 are situated under an application layer 202.

In contrast, the protocols referred to below as service-oriented communication protocols are combined as applications 216. Examples of applications 216 are HTTP, UDS, FTP, SMTP, POP, Telnet, DHCP, OPC UA, SOCKS, SOME/IP, DDS. The other protocols are designated as underlying protocols 218. Examples of underlying protocols 218 are TCP, UDP, SCTP, IP (IPv4, IPv6), ICMP, Ethernet, Token Bus, Token Ring, FDDI.

In the description below, an operating mode is described using SOME/IP as an example. This operating mode is correspondingly applicable to other service-oriented communication protocols such as DDS.

SOME/IP, in addition to the actual communication protocol, defines a dedicated mechanism for service discovery, i.e., for finding and managing services at run time. For this purpose, SOME/IP specifies the SOME/IP service discovery (SOME/IP-SD) protocol in addition to the SOME/IP protocol. For example, information concerning which of the end points uses a SOME/IP service or a SOME/IP client is transmitted via SOME/IP-SD. In this way, a SOME/IP client may find a SOME/IP service, and vice versa. Communication between a SOME/IP service and a SOME/IP client and vice versa is thus possible.

Figure 3:
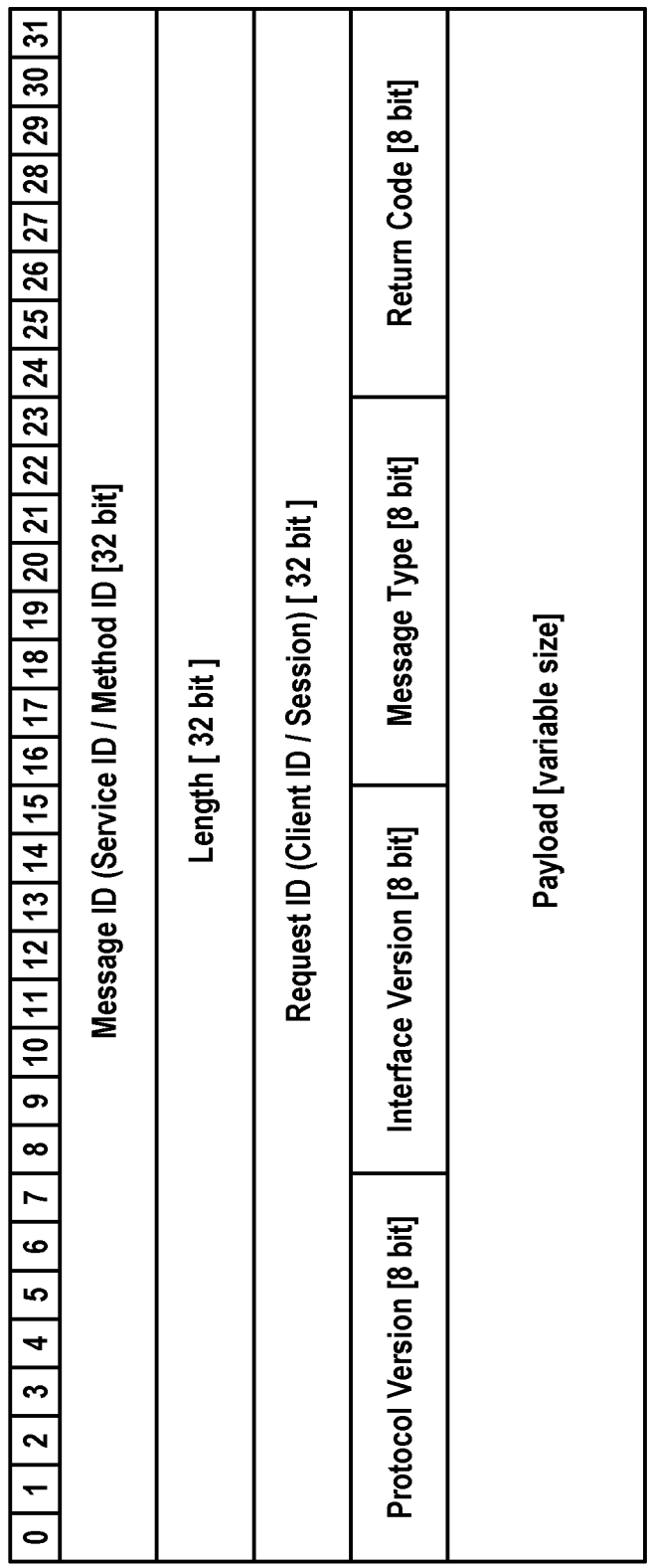
FIG. 3 shows a SOME/IP header.

FIG. 3 illustrates a SOME/IP header. FIG. 4 illustrates a SOME/IP-SD packet. FIG. 5 illustrates a SOME/IP-SD IPv4 end point option.

The checking of the functional performance of service-oriented middleware based on SOME/IP, as described below, takes place using information from protocols that typically underlie the protocol that implements the service-oriented communication in communications network 100.

In a data packet of service-oriented communication, so-called "end points" of the communication are identified, for example, in the headers of the underlying protocol layers. These are identified based on their MAC address, IP address, or port number, for example.

The end points of the communication relationships in a certain vehicle whose communication is analyzed are preferably defined statically and in advance. In this case, the following information or a subset thereof is provided to the NIDPS as "system knowledge":

ports of the transport layer that are used for service-oriented communication.
 registered end points that are used by service providers ("services") and by service users ("clients").
 registered identifiers for service providers ("service ID") and for service users ("client ID").
 for each "service ID," a list of registered end points that are allowed to offer the service designated as "service ID."
 for each "client ID," a list of registered end points that are allowed to use the service designated as "client ID."
 registered combinations of service users and service providers: registered combinations of "client ID" and "service ID" and/or registered combinations of end points, i.e., which end point a service user (client) is allowed for which service provider (service).

Figure 6:
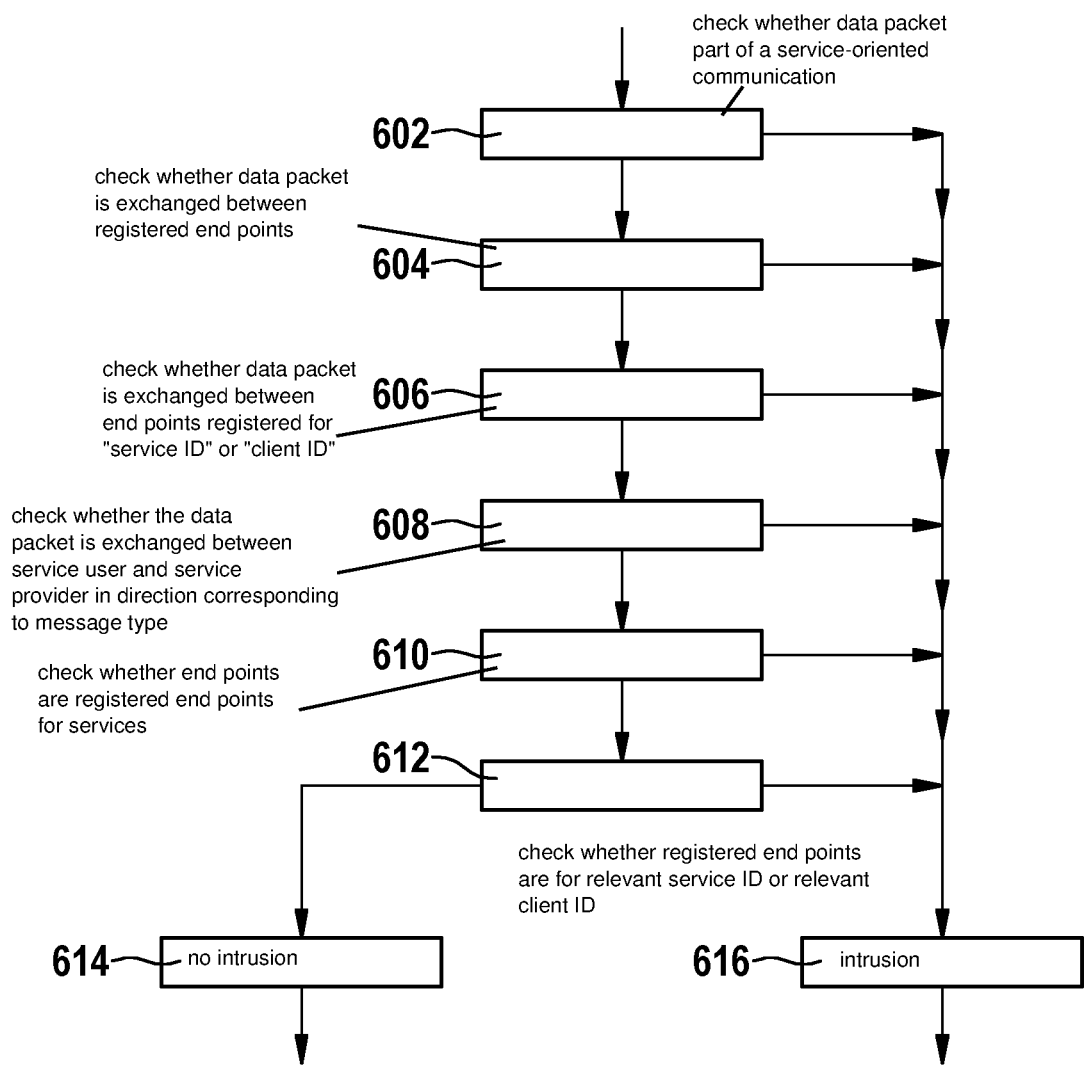
FIG. 6 shows steps in an example method for analyzing service-oriented communication in the communications network.

A method for analyzing for the anomaly detection is described with reference to FIG. 6. An identification of a service, i.e., a service that is offered in the service-oriented communication, is referred to below as "service ID." An identification of a client, i.e., a service user of a service that is offered in the service-oriented communication, is referred to below as "client ID."

The method starts, for example, when the NIDPS receives a data packet. The headers contained in the data packet are preferably analyzed in succession. An analysis of one certain header or of multiple certain headers may also be carried out.

It is checked in a step 602 whether the data packet is part of a service-oriented communication. If this is the case, a step 604 is carried out. Otherwise, the method is ended.

The NIDPS checks in step 604 whether the data packet is exchanged between registered end points.

The NIDPS preferably checks whether the data packet is sent from a registered end point. The NIDPS preferably checks whether the data packet is sent to a registered end point.

When the data packet is sent between registered end points, a step 606 is carried out. Otherwise, a step 616 is carried out.

The NIDPS checks in step 606 whether the data packet is exchanged between end points that are registered for the "service ID" or "client ID" identified in the data packet.

For the sender end point and the receiver end point of the data packet, the NIDPS preferably checks whether they correspond either to the service provider designated by its service ID, identified in the data packet, or to the service user designated in the message, identified by its client ID. The NIDPS preferably checks whether the sender end point and the receiver end point of the data packet form a registered combination.

When the data packet is exchanged between end points that are registered for the service ID or client ID designated in the data packet, a step 608 carried out. Otherwise, step 616 is carried out.

The NIDPS checks in step 608, based on the end points, whether the data packet is exchanged between a service user and a service provider in the direction corresponding to the message type.

For a data packet, it is preferably checked whether it is sent between a service user and a service provider in the direction corresponding to the message type. For SOME/IP, this information is not to be extracted from the SOME/IP header alone. As is apparent in FIG. 3, the SOME/IP header contains no information concerning whether the data packet is sent from a SOME/IP service to a SOME/IP client, or vice versa. However, the analysis of the sender end point and the receiver end point allows such an analysis. This allows the NIDPS to check whether a certain end point as provided interacts as a client or as a service.

When the data packet is exchanged between a service user and a service provider in the direction corresponding to the message type, a step 610 is carried out. Otherwise, step 616 is carried out.

The NIDPS checks in step 610 whether the end points, which are transmitted as end points of services during the service discovery phase, are registered end points for services.

For example, information in SOME/IP-SD packets is checked. As illustrated in FIG. 4, a SOME/IP-SD packet is made up of a header, a so-called "entries array," and an "options array." FIG. 5 shows an entry in the options array, in which an IPv4 end point, i.e., an IPv4 address, a port number, and a piece of information concerning the transport protocol used, is transmitted. This allows the NIDPS to check that only end points that are also provided for a SOME/IP communication are transmitted as end points in SOME/IP-SD packets.

When the end points, which are transmitted as end points of services during the service discovery phase, are registered end points for services, a step 612 is carried out. Otherwise, step 616 is carried out.

NIDPS checks in step 612 whether information concerning end points transmitted during the service discovery phase are registered end points for either the relevant service ID or the relevant client ID.

This check preferably takes into account that services of a particular service ID in "publish" messages as well as service users of a particular client ID in "subscribe" messages communicate their end points in various service discovery messages.

When information concerning end points that are transmitted during the service discovery phase are registered end points for either the relevant service ID or the relevant client ID, a step 614 is carried out. Otherwise, step 616 is carried out.

As a result of the analysis of the data packet, it is determined in step 614 that no intrusion in communications network 100 has been identified. This information is preferably output.

The method subsequently ends for this data packet. A similar procedure is followed for further data packets.

As a result of the analysis of the data packet, it is determined in step 616 that an intrusion on communications network 100 is present. This information is preferably output.

The method subsequently ends for this data packet. A similar procedure is followed for further data packets.

The described steps may be carried out in this order or in some other order. All of the steps or the same steps do not have to be carried out for each packet.

By use of the method, in an automotive Ethernet network the network traffic at the existing Ethernet ports may be analyzed. As a function of the analysis, anomalies that are caused by an intruder in the network may be identified. In the example, this analysis takes place at the automotive Ethernet switch, at whose hardware ports or switch ports the data packets arrive. The analysis may also take place at any other user on the automotive Ethernet network in a vehicle.

It may be provided to identify anomalies in the network traffic in the automotive network and respond to these intrusions.

Due to the use of information of the protocols which according to the OSI model underlie the protocols that implement service-oriented middleware, the following is achieved:

- It is ensured that data packets are sent only from authorized network users. Network users may be identified with end points, for example. The end points are identified, for example, by an IP address, a port number, and information concerning which transport protocol is used.
- A check is made concerning between which network users data packets are exchanged within the service-oriented communication. This is particularly advantageous when this information is not necessarily available from the data packet of a service-oriented communication protocol.
- A check is made that only allowed end points are communicated to network users during the discovery phase, the so-called "service discovery," of a service-oriented communication protocol.

What is claimed is:

1. A method for analyzing service-oriented communication in a communications network, wherein a data packet includes a first header of an application layer for service-oriented communication, and a second header of a protocol layer which is different from the application layer, for communication in the communications network, the protocol layer which is different from the application layer being of a presentation layer, or a session layer, or a transport layer, or a network layer, or a data link layer, or a physical layer, the method comprising:
   analyzing the data packet of the communications network, as a function of information concerning a sender and/or receiver of the data packet from the first header and as a function of information concerning a sender and/or receiver from the second header, for whether or not the data packet meets a criterion, the criterion defining a setpoint value for the sender and/or receiver in the first header as a function of content of the second header, and/or the criterion defining a setpoint value for the sender and/or receiver in the second header as a function of content of the first header, wherein the communications network is an automotive communications network internal to a vehicle;
   wherein the data packet includes information concerning a message type of the data packet, and wherein the analyzing step includes checking whether the data packet is being exchanged between a service user and a service provider in a direction corresponding to the message type of the data packet, and detecting an anomaly or an intrusion in the communications network based on the checking.

2. The method as recited in claim 1, wherein the setpoint value defines at least one registered end point, and wherein the checking step includes checking a header, as a function of content of the header, whether the data packet is sent from a registered end point and/or whether the data packet is sent to a registered end point, the header being the first header and/or the second header.

3. The method as recited in claim 1, wherein the setpoint value defines registered end points, and wherein the checking step includes checking a header, as a function of content of the header, whether the data packet is exchanged between end points that are registered for the service-oriented communication, the header being the first header and/or the second header.

4. The method as recited in claim 1, wherein the setpoint value defines at least one registered end point, and the data packet includes an identification of a service, wherein for a sender end point of the data packet, in the analyzing step, it is checked whether the sender end point corresponds to a service provider designated in the data packet, identified by the identification of the service, and wherein for a receiver end point of the data packet, in the checking step, it is checked whether the receiver end point corresponds to a service user designated in the data packet, identified by an identification of a client.

5. The method as recited in claim 1, wherein the setpoint value defines at least one registered end point, and the data packet includes an identification of a client, wherein for a sender end point of the data packet, in the analyzing step, it is checked whether the sender end point corresponds to a service user designated in the data packet, identified by the identification of the client, and wherein for a receiver end point of the data packet, in the checking step, it is checked whether the receiver end point corresponds to a service provider designated in the data packet, identified by an identification of a service.

6. The method as recited in claim 1, wherein the setpoint value defines registered end points, and the data packet includes an identification of a service and an identification of a client, wherein in the checking step, it is checked whether the data packet is exchanged between end points that are registered for the identification of the service identified in the data packet and the identification of the client identified in the data packet.

7. The method as recited in claim 6, wherein, in the checking step, it is checked whether a sender end point and a receiver end point of the data packet form a registered combination.

8. The method as recited in claim 1, wherein during a service discovery phase, it is checked whether for a data packet via which information concerning an end point that offers a service is transmitted, the end point that offers the service is an end point that is registered as a service provider and/or is an end point that is registered for the offered service as a service provider.

9. The method as recited in claim 1, wherein during a service discovery phase, it is checked whether for a data packet via which information concerning an end point that queries a service is transmitted, the end point that queries the service is an end point that is registered as a service user and/or is an end point that is registered for the queried service as a service user.

10. The method as recited in claim 1, wherein before checking the criterion, it is checked whether the data packet is part of a service-oriented communication, the check of the criterion being carried out when the data packet is part of a service-oriented communication, and otherwise the check not taking place.

11. A device for analyzing service-oriented communication in a communications network, comprising:
   an analysis device situated in a connecting element which connects data lines in the communications network for transmitting data packets, or is connected or connectable to the connecting element for communication, the analysis device being configured to analyze service-oriented communication in a communications network, wherein a data packet includes a first header of an application layer for service-oriented communication, and a second header of a protocol layer which is different from the application layer, for communication in the communications network, the protocol layer which is different from the application layer being of a presentation layer, or a session layer, or a transport layer, or a network layer, or a data link layer, or a physical layer, the analysis device being configured to:

analyze the data packet, as a function of information concerning a sender and/or receiver of the data packet from the first header and as a function of information concerning a sender and/or receiver from the second header, for whether or not the data packet meets a criterion, the criterion defining a setpoint value for the sender and/or receiver in the first header as a function of content of the second header, and/or the criterion defining a setpoint value for the sender and/or receiver in the second header as a function of content of the first header, wherein the data packet includes information concerning a message type of the data packet, and wherein the analysis of the data packet by the analysis device includes checking whether the data packet is being exchanged between a service user and a service provider in a direction corresponding to the message type of the data packet, and detecting an anomaly or an intrusion in the communications network based on the checking;

wherein the communications network is an automotive communications network internal to a vehicle.

12. The device as recited in claim 11, wherein the connecting element is an automotive Ethernet switch.

13. A non-transitory computer-readable memory medium on which is stored a computer program analyzing service-oriented communication in a communications network, wherein a data packet includes a first header of an application layer for service-oriented communication, and a second header of a protocol layer which is different from the application layer, for communication in the communications network, the protocol layer which is different from the application layer being of a presentation layer, or a session layer, or a transport layer, or a network layer, or a data link layer, or a physical layer, the computer program, when executed by a computer, causing the computer to perform:

analyzing the data packet of the communications network, as a function of information concerning a sender and/or receiver of the data packet from the first header and as a function of information concerning a sender and/or receiver from the second header, for whether or not the data packet meets a criterion, the criterion defining a setpoint value for the sender and/or receiver in the first header as a function of content of the second header, and/or the criterion defining a setpoint value for the sender and/or receiver in the second header as a function of content of the first header, wherein the communications network is an automotive communications network internal to a vehicle;

wherein the data packet includes information concerning a message type of the data packet, and wherein the analyzing step includes checking whether the data packet is being exchanged between a service user and a service provider in a direction corresponding to the message type of the data packet, and detecting an anomaly or an intrusion in the communications network based on the checking.

* * * * *